US006266161B1

(12) United States Patent
Hara

(10) Patent No.: US 6,266,161 B1
(45) Date of Patent: Jul. 24, 2001

(54) IMAGE READING AND TRANSMITTING SYSTEM

(75) Inventor: Shoji Hara, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/599,573

(22) Filed: Jun. 23, 2000

Related U.S. Application Data

(63) Continuation of application No. 08/888,325, filed on Jul. 3, 1997.

(30) Foreign Application Priority Data

Jul. 4, 1996 (JP) ................................................ 12-175249

(51) Int. Cl.[7] .................................................... H04N 1/00
(52) U.S. Cl. ............................................................ 358/434
(58) Field of Search .................................. 382/312, 321; 358/474, 400, 404, 434, 435, 436, 442, 471

(56) References Cited

U.S. PATENT DOCUMENTS

| | | | | |
|---|---|---|---|---|
| 4,258,264 | * | 3/1981 | Kotera et al. ........................ 250/484 |
| 4,288,264 | * | 9/1981 | Haque .................................... 156/67 |
| 4,960,993 | * | 10/1990 | Shigyo .............................. 250/327.2 |
| 4,969,049 | * | 11/1990 | Mitani ................................... 358/296 |
| 5,440,403 | * | 8/1995 | Hashimoto ........................... 358/444 |
| 5,613,051 | * | 3/1997 | Iodice ................................... 395/128 |
| 5,617,542 | * | 4/1997 | Williams ......................... 395/200.14 |
| 5,651,362 | * | 7/1997 | Shigyo .................................. 395/181 |
| 5,659,164 | * | 8/1997 | Schmid ................................. 235/375 |
| 6,002,423 | * | 12/1999 | Rappaport ............................. 348/42 |
| 6,154,289 | * | 11/2000 | Hara ..................................... 358/434 |

FOREIGN PATENT DOCUMENTS 405020484A  1/1993 (JP) .

* cited by examiner

*Primary Examiner*—Jerome Grant
(74) *Attorney, Agent, or Firm*—Sughrue, Mion, Zinn, Macpeak & Seas, PLLC

(57) ABSTRACT

In an image reading and transmitting system for transmitting image data acquired by an image reading apparatus to a variety of processing apparatus through a network, reliability of the image data to be transmitted is improved without increasing an operator's workload. Image data being acquired by an image reading apparatus is stayed by a stay processing apparatus for a time sufficient for an operator to judge the usefulness of the data and to cancel transmission of the data if necessary. If no command to cancel transmission is given by the operator, the data is automatically transmitted to a network.

17 Claims, 1 Drawing Sheet

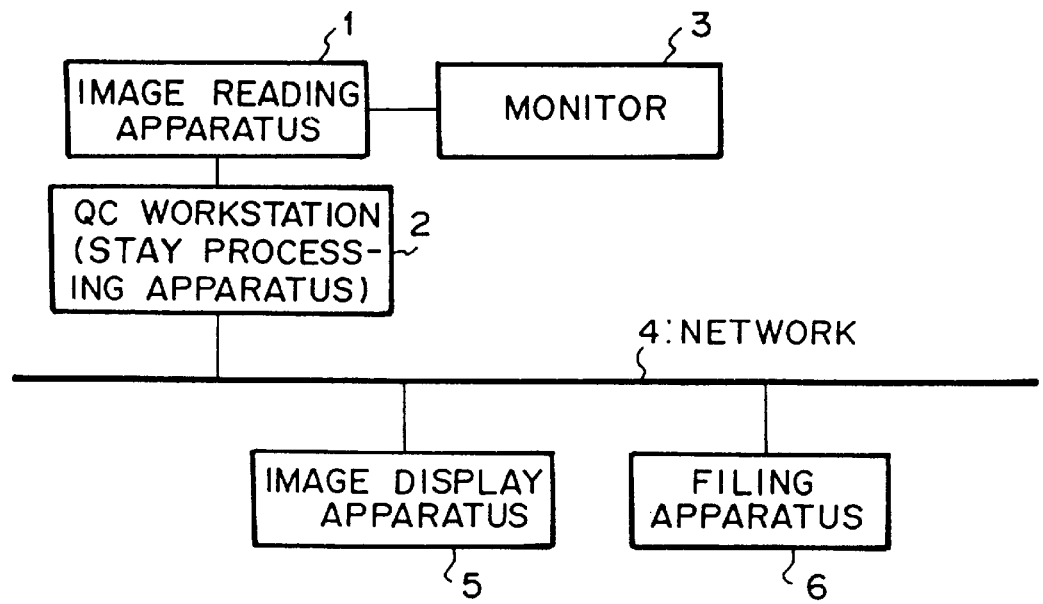
F I G.1
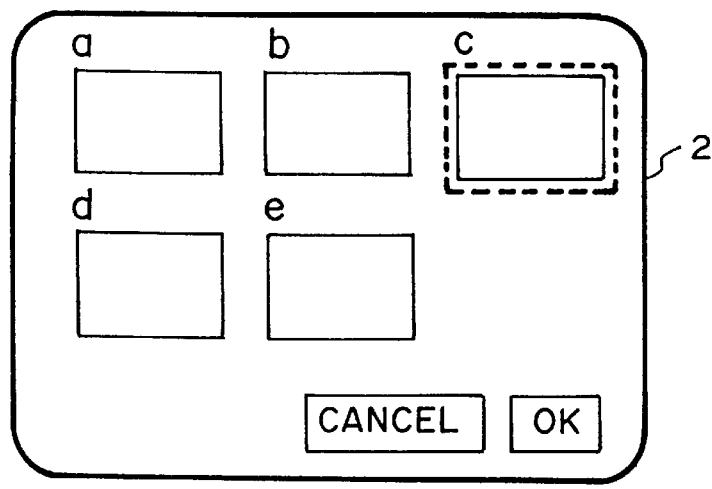
F I G.2
DISPLAY SCREEN OF QC WORKSTATION
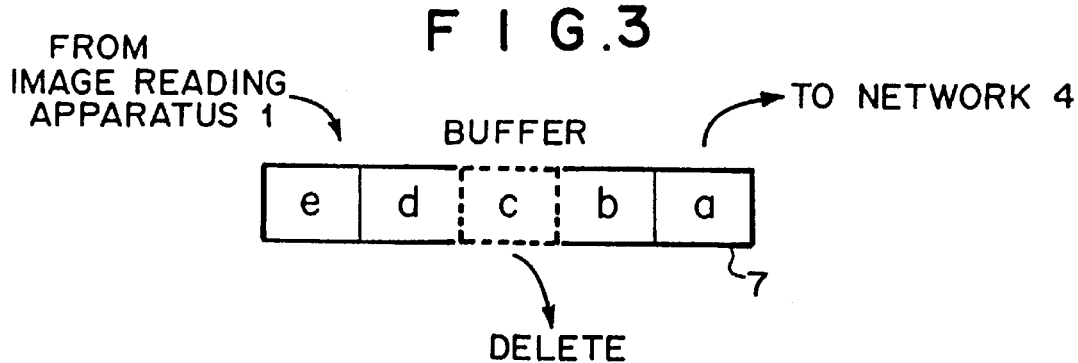
F I G.3

IMAGE READING AND TRANSMITTING SYSTEM

This is a continuation of application Ser. No. 08/888,325 filed Jul. 3, 1997, the disclosure of which is incorporated herein by reference.

BACKGROUND OF THE INVENTION

1. Field of the Invention

The present invention relates to an image reading and transmitting system which transmits image data acquired by an image reading apparatus through a network to a variety of processing apparatus.

2. Description of the Related Art

There have been known image reading and transmitting systems for transmitting image data acquired by image reading apparatus through networks to processing apparatus for displaying, processing, printing, or storing the image data. For example, in U.S. Pat. No. 4,258,264, the applicant proposed a medical system for reading a radiation image of a human body recorded on a stimulable phosphor sheet by laser beam scanning, and also for recording/reproducing or storing/managing the acquired image data after a variety of image processing is performed thereon. In the aforesaid medical system, the acquired radiation image data is transmitted through a local area network or the like to a display apparatus which is used by a doctor for diagnosis.

Systems as described above are generally provided in two forms. A first form automatically transmitts image data acquired by an image reading apparatus to a network, while a second form image data acquired by an image reading apparatus on a monitor or the like so that an operator who carries out the reading operation can examine whether or not the image data being displayed is wanted image data, and the operator carries out image data transmission to a network only when the image data is judged to be the wanted image data The first form is the best from the viewpoint of an operator's operation efficiency. However, the first form results in a heavier workload on the end user, since unsuccessfully read image data are also transmitted over a network. Therefore leads to the fact that the user has to distinguish wanted image data from the unsuccessfully read image data. The first form is also not preferable from the viewpoint of network load, since unnecessary image data are also transmitted over a network.

On the other hand, the second form does not have the problems associated with the first form, since only wanted image data are transmitted to a network by an operator. However, in large hospitals where a large amount of radiation images must be processed every day, other problems such as sluggish image data transmission occur, due to the heavy workload on an operator.

SUMMARY OF THE INVENTION

The object of the present invention is to solve the above-described problems of the two known forms. In other words, the object of the present invention is to provide an image reading and transmitting system that lowers the workload of an operator, with high reliability of image transmission, and with less network load.

The image reading and transmitting system of the present invention is a system which transmits image data acquired by an image reading apparatus included in the system through a network to one or more processing apparatus dealing with the image data, and comprises a stay processing apparatus for transmitting the acquired image data to the network after staying the image data for a predetermined time, a monitor for displaying the image data being stayed by the stay processing apparatus, and a transmission canceling means for canceling transmission of the stayed image data to the network.

The term "one or more processing apparatus dealing with the image data" includes for example, one or more of display apparatus and printers, personal computers, or workstations, all of which are remotely connected to the network.

The term "stay processing apparatus" does not necessarily mean an apparatus only aiming to stay image data. The stay processing apparatus can be a universal or general purpose workstation. In other words, any processing apparatus can be the stay processing apparatus as long as the processing apparatus is connected to a network and is capable of controlling a flow of image data. The stay processing apparatus can also be a processing apparatus which carries out other kinds of processing such as brightness control of the image data while stay processing is being carried out.

The "monitor" can be connected to the image reading apparatus. Alternatively, if the stay processing apparatus is a workstation, the monitor can be a display screen of the workstation. The "transmission canceling means" can be means included in the aforesaid stay processing apparatus. Alternatively, another processing apparatus may be placed between the stay processing apparatus and the network so that the transmission canceling means can be included in processing apparatus different from the stay processing apparatus. The transmission canceling means refers to, for example, software for deleting image data which is specified to be deleted, in response to an input via an input/output apparatus such as a display apparatus or a keyboard.

The term "predetermined time" means a sufficient time for an operator to judge, using the monitor, whether or not the image data being stayed is wanted image data, and, in the case where image data is judged to be poor quality image data, to cancel transmission of the poor quality image data by the aforesaid transmission canceling means.

The image reading and transmitting system of the present invention may further comprise a transmission facilitating means for transmitting the image data being stayed to the network before the predetermined time has elapsed. The term "transmission facilitating means" refers to, software for processing image data which is specified to be processed, in response to an input via input/output apparatus such as a display apparatus or a keyboard. For example, the transmission facilitating means resets a timer which measures how much of the predetermined time has elapsed, or gives a higher priority to an image data waiting in a transmission queue so that the image given the higher priority thereby can be transmitted to the network immediately without waiting for the predetermined time to elapse.

The image reading apparatus of the present invention may further comprise a stay time setting means for setting the predetermined time. To have the stay time setting means does not mean that setting the predetermined time is performed only by the image reading apparatus. The stay processing apparatus which carries out the stay processing may also comprise the same stay time setting means as the image reading apparatus.

The aforesaid "image reading apparatus" and "stay processing apparatus" can be connected locally. Alternatively, they can be connected via the aforesaid "network" or another network.

In accordance with the image reading and transmitting system of the present invention, the image data acquired by the image reading apparatus is stayed before being transmitted to the network, and the image data will automatically be transmitted to the network after the operator judges whether or not the image data being stayed is appropriate for diagnosis during the stay time which is sufficient for the operator to cancel transmission of the image data if necessary. Therefore, the operator does not need to carry out any operation other than to cancel transmission, and unnecessary image data are not transmitted to the network. In this manner, cases where a user of the image data is confused by unnecessary image data and a network load being increased unnecessarily will be avoided.

The image reading and transmitting system may further comprise a transmission facilitating means for transmitting image data being stayed before the predetermined stay time has elapsed. In this manner, the operator can immediately transmit the data of the image he or she has judged to be useful, and start examining the incoming image data. As a consequence, the operator can work efficiently.

The stay time may be set not only by the stay processing apparatus but also by the image reading apparatus. In this manner, the operator can set an appropriate stay time depending on the occurrence frequency of unsuccessful reading, while carrying out a reading operation.

BRIEF DESCRIPTION OF THE DRAWINGS

FIG. 1 is a view schematic showing a network of an image reading and transmitting system according to the present invention, FIG. 2 is a view showing a display screen of a QC workstation, and FIG. 3 is a view showing a buffer used in the QC workstation.

DESCRIPTION OF THE PREFERRED EMBODIMENTS

The preferred embodiment of the present invention will hereinbelow be described in further detail with reference to the accompanying drawings. The embodiments described hereinbelow are related to a medical system as described the above. FIG. 1 shows an outline of the system As shown in FIG. 1, an image reading and transmitting system in accordance with the present invention comprises an image reading apparatus 1, a stay processing apparatus 2 which is connected between the image reading apparatus 1 and a network 4 and which stays image data acquired by the image reading apparatus 1, a monitor 3 for displaying the image read or being read by the image reading apparatus 1 for the purpose allowing an operator to examine the image, an image display apparatus 5 for displaying the image data for a user, a filing apparatus 6 for adding an identification number or the like to the image data and also for storing/managing the image data in a predetermined storage medium, and a network 4 for connecting the stay processing apparatus 2, the image display apparatus 5, the filing apparatus 6, and the like.

The image reading apparatus 1 is an apparatus which reads a radiation image of a human body recorded on a stimulable phosphor sheet by laser beam scanning. The image reading apparatus 1 is placed, for example, in an image recording room where a radiation image as described above is taken.

The stay processing apparatus 2 is a general purpose workstation and is normally placed adjacent to the image reading apparatus 1. In this embodiment, the aforesaid general purpose workstation 2 and the image reading apparatus 1 are connected locally. They can also be connected via a network, however. In the medical system of this embodiment, this general purpose workstation is called a Quality Control (QC) workstation, and carries out a variety of processing for improving reliability and quality of an image to be transmitted to the network. The QC workstation carries out the processing of the present invention for improving the reliability, that is, creating an opportunity for an operator to examine the image while the data of the image is stayed. The QC workstation also carries out the processing for improvement of the image quality such as brightness control or contrast adjustment of the image being stayed, and correction of wrong ID information.

The monitor which belongs to the image reading apparatus 1 is used as the monitor 3. An operator observes the monitor when image reading has finished, and examines if wanted image data has been obtained. The image data is also displayed on a display screen of the workstation while the image data is being stayed. Therefore, the operator can examine the image data while it is displayed on the screen. However, it is preferable that the operator examines each image data in detail after each image reading operation has finished, since the display screen of the workstation is for displaying a plurality of image data so that the operator can select the image data whose transmission should be canceled.

The image display apparatus 5 is to be placed near a doctor who is a user of the image data. That is, the image display apparatus 5 is placed in a room such as an examining room. The filing apparatus 6 is an apparatus for storing/managing the image data. The filing apparatus is to be placed in a room such as the examining room or a control room. The above-described-apparatus being placed remotely in a hospital are connected through what is called a LAN (the network 4) so that they can communicate with each other.

Processing by the QC workstation 2 will be explained in detail hereinbelow referring to FIGS. 2 and 3. In the QC workstation 2, the image data transmitted from the image reading apparatus 1 are stored sequentially in a buffer 7. The image data stored in the buffer 7 are, in principle, transmitted to the network in a first-in first-out manner. In other words, the image data stored in the buffer 7 are transmitted to the network in the order in which they were stored at a predetermined interval time. In this manner, each image data stays in the buffer 7 for a constant time. The image data being stored in the buffer 7 are shown on the display screen of the QC workstation 2 with indices. Therefore, the operator can specify the image not to be transmitted to the network using these indices. For example, as shown in FIG. 2, if the operator chooses the image c among the images shown on the screen and presses the CANCEL button, the image data of the image having selected by the operator is deleted from the buffer 7. As a result, the image c will never be transmitted to the network even when the predetermined stay time has elapsed.

As described above, the operator can carry out the transmission canceling processing on the image data being stayed, if necessary. In other words, the stay time is set so that, in normal operation, the operator can judge the image quality and operate the apparatus with sufficient time. However, how much the operator must operate depends on what kind of image data are to be processed or the like. Therefore, in the case where the quality of the image read by the image reading apparatus is high, the operator who has finished examining the image may have to wait until the image is transmitted to the network.

Therefore, in the embodiment of the present invention, transmission facilitating means is provided so that image data transmission to the network can be speeded up, if necessary. In the example shown in FIG. 2 the OK button displayed on the screen of the workstation corresponds to the transmission facilitating means. If the operator presses this button, the QC workstation 2 immediately transmits to the network the image data which was stored in the buffer 7 at the earliest time among the images being stored in the buffer 7. Therefore, by pressing the OK button continually, the operator can transmit the image data being stayed to the network one by one and can create free space in the buffer 7. In this manner, the operator can proceed to the next image reading operation.

In this particular embodiment, the transmission facilitating means is described as not including a function to select the image data, and transmission of the image data is carried out in the same order as the order of storage in the buffer. However, the QC workstation 2 may carry out processing to change the transmission order of the image data being stored in the buffer 7, in response to the operator's selection of the image data to be transmitted immediately among the image data being displayed on the screen.

Methods to set the stay time of the image data will be explained hereinbelow. Two methods are provided to set the stay time in the present embodiment. A first method is to set the stay time using the QC workstation 2, while a second method is to set the stay time using the image reading apparatus 1. In each method, the operator calls a value setting screen on either the monitor 3 or the display screen of the QC workstation 2, and specifies a desired stay time. If the operator sets the stay time as described above using the QC workstation 2, the value set as the stay time is reflected in, for example, the stay time in the buffer 7. If the stay time is set by the image reading apparatus 1, the image reading apparatus 1 transmits both the time having been set and the image having been read to the QC workstation 2, with the time being in a form of, for example, a header information added to the image data. If the QC workstation 2 receives the image data with the header information including the time set as described above, the QC workstation carries out processing such as changing the stay time in the buffer 7 based on the information received. As described above, if the stay time setting information can be included in the header information of each image data, the stay time for each image data can be set respectively. By separately deciding an exclusive data format, only command information regarding the stay time setting may be transmitted so that the stay in time may be applied to the image data which will be processed after the reception of the command information.

As described above, by letting the image reading apparatus be able to set the stay time, in the case where the image data being read is, for example, image data to diagnose a patient in critical condition, the stay time can be set to 0 so that the image data is transmitted to a doctor immediately. Alternatively, in the case where an occurrence frequency of poor quality images is high, the stay time can be extended, while in the case of easy reading where few poor quality images occur, the stay time can be shortened. In this manner, changing stay time depending on a case can be possible. As described above, in accordance with the image reading and transmitting system of the present invention, only useful image data can be transmitted to a user with minimal necessary operation by the operator.

What is claimed is:

1. A radiation image reading and transmitting system which transmits image data acquired by a radiation image reading apparatus to one or more processing apparatus dealing with the image data through a network comprising:

a stay processing apparatus which stays the image data acquired by the radiation image reading apparatus for a predetermined time, and transmits the image data through the network after a respective predetermined time elapses for each respective image data;

a monitor for displaying the image data being stayed by the stay processing apparatus; and a transmission canceling means for canceling transmission of the image data being stayed to the network.

2. A radiation image reading and transmitting system as defined in claim 1 which further comprises a stay time setting means for setting the respective predetermined time for staying each respective image data.

3. A radiation image reading and transmitting system as defined in claim 1 which further comprises a transmission facilitating means for facilitating transmission to the network of the image data being stayed before the respective predetermined time for the respective image data has elapsed.

4. A radiation image reading and transmitting system as defined in claim 3 which further comprises a stay time setting means for setting the respective predetermined time for staying each respective image data.

5. A radiation image reading apparatus according to claim 4, wherein the stay processing apparatus stores at least a first image data received in the stay processing apparatus first and a second image data received in the stay processing apparatus second, wherein the transmission facilitating means outputs one of the first and second image data in an order designated by a user.

6. A radiation image reading apparatus according to claim 5 wherein the monitor displays each respective image data until the occurrence of at least one of lapse of the respective predetermined time for the respective image data and receipt of a cancellation signal supplied by a user to the transmission cancelling means.

7. The image reading and transmission system according to claim 1, wherein the monitor simultaneously displays an image corresponding to the image data as the image data is stayed by the stay processing apparatus.

8. The image reading and transmitting system according to claim 7, wherein the stay processing means stays data for an entire image output by the radiation image reading apparatus at one time.

9. The image reading and transmitting system according to claim 8, wherein the stay processing means is disposed between the image reading apparatus and the network.

10. The image reading and transmitting system according to claim 1, wherein the transmission canceling means further comprises means for deleting image data from the stay processing apparatus.

11. A radiation image reading and transmitting system which transmits image data corresponding to pixel information acquired by a radiation image reading apparatus to one or more processing apparatus dealing with the image data through a network comprising:

a stay processing apparatus which stays the image data acquired by the radiation image reading apparatus for a predetermined time corresponding to a time to determine the quality of respective image data, and transmits the image data through the network after the respective predetermined time elapses for each respective image data;

a monitor for displaying the image data being stayed by the stay processing apparatus; and a transmission canceling means for canceling transmission of the image data being stayed to the network.

12. The image reading and transmitting system according to claim 11, wherein the transmission canceling means further comprises means for deleting image data from the stay processing apparatus.

13. A radiation image reading and transmitting system as defined in claim 11 which further comprises a transmission facilitating means for facilitating transmission to the network of the image data being stayed before the predetermined time has elapsed.

14. A radiation image reading and transmitting system as defined in claim 13 which further comprises a stay time setting means for setting the respective predetermined time for staying each respective image data.

15. The image reading and transmission system according to claim 11, wherein the monitor simultaneously displays an image corresponding to the image data as the image data is being stayed by the stay processing apparatus.

16. The image reading and transmitting system according to claim 15, wherein the stay processing means stays data for an entire image output by the radiation image reading apparatus at one time.

17. The image reading and transmitting system according to claim 16, wherein the stay processing means is disposed between the image reading apparatus and the network.

* * * * *